United States Patent
Schindel et al.

[15] 3,669,231
[45] June 13, 1972

[54] SYNCHRONIZED ELECTROMAGNETIC CLUTCH

[72] Inventors: Arnold Schindel, Fairlawn; Vincent E. Coyle, Wayne, both of N.J.

[73] Assignee: The Singer Company, New York, N.Y.

[22] Filed: Dec. 3, 1970

[21] Appl. No.: 94,716

[52] U.S. Cl. ...................................192/53 D, 192/84 C
[51] Int. Cl. .....................................F16d 23/10, F16d 27/10
[58] Field of Search ..........................192/53 D, 84 C, 84 P

[56] References Cited

UNITED STATES PATENTS 2,876,878  3/1959  Sinclair et al. .................192/53 D X
2,962,141  11/1960  Rudisch ...........................192/53 D

FOREIGN PATENTS OR APPLICATIONS 1,054,288  4/1959  Germany ............................192/84 P Primary Examiner—Allan D. Herrmann
Attorney—S. A. Giarratana and Thomas W. Kennedy

[57] ABSTRACT

A synchronized electromagnetic clutch is provided having input and output members which are provided with circumferentially disposed teeth which align with each other by means of a flow of magnetic flux so that axially disposed teeth on the face portions of the respective members will be in position to fully engage when the members are attracted to each other.

3 Claims, 5 Drawing Figures

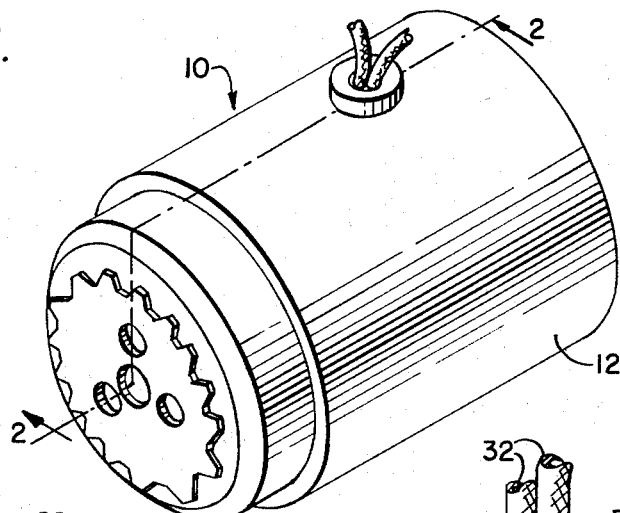
FIG. 1.
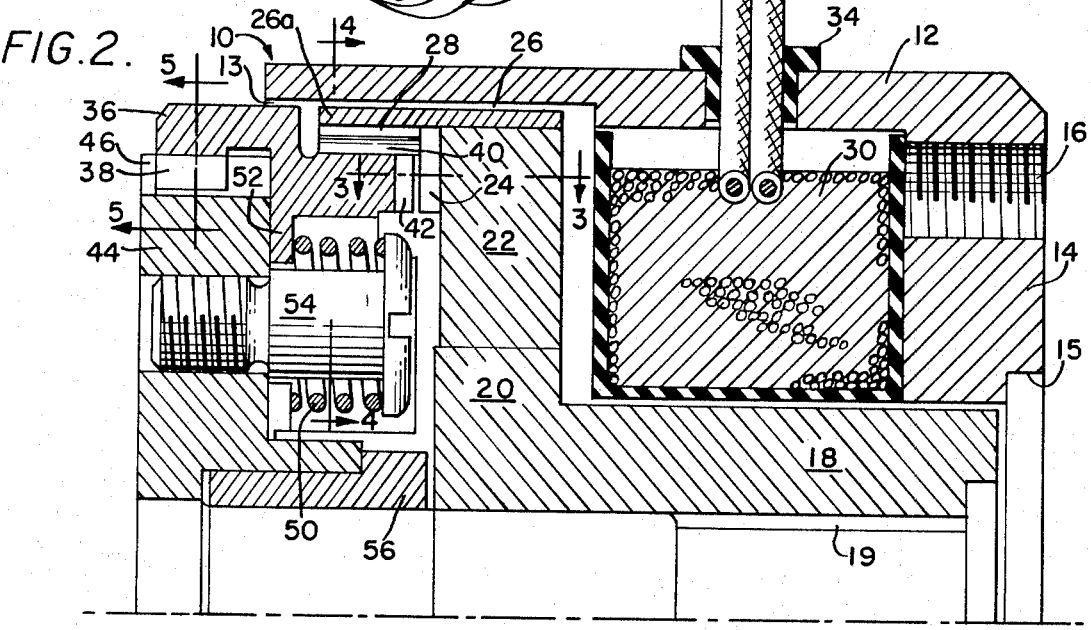
FIG. 2.
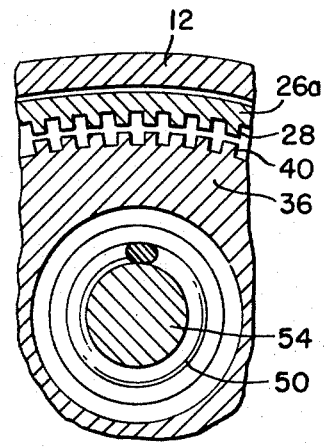
FIG. 4.
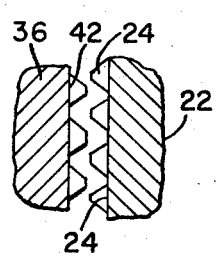
FIG. 3
FIG. 5.
INVENTORS
ARNOLD SCHINDEL &
VINCENT COYLE
BY S.A. GIARRATANA
Thomas W. Kennedy
ATTORNEY

SYNCHRONIZED ELECTROMAGNETIC CLUTCH

BACKGROUND OF THE INVENTION

This invention relates to a form-locking electromagnetic clutch comprising input and output clutch members which are synchronized so as to provide for consistent, maximum coupling therebetween.

In the design of form-locking or jaw-type electromagnetic clutches it has been customary to provide a driving connection by utilizing clutch members having tooth-type projections axially disposed on their face portions so that when energized the respective clutch members interlock with each other. The proper functioning of such a system has been inconsistent in the past because of a tendency of the respective tooth-type projections to become misaligned when the clutch members are disengaged. In such instances, when the engagement current is once again applied the misaligned teeth may come together at their tips so as to prevent a complete coupling of the members. This condition causes significant wear on the clutch members and requires correction by rotating one member relative to the other. While this appears to be a simple measure, in fact, it can be accomplished only if one member is provided with a passive load so that both members do not turn together. Under the circumstances in which a clutch of this type is normally employed the difficulty of providing such a critical load level is apparent.

SUMMARY OF THE INVENTION

Accordingly, it is a primary object of this invention to provide an electromagnetic clutch wherein an input clutch member is automatically aligned with an output clutch member when energized so as to provide for maximum interlocking therebetween.

This and other objects of the present invention are accomplished by providing both input and output clutch members with circumferentially disposed teeth which automatically align with each other when energized so that axially disposed teeth on the face portions of the respective clutch members will be in a position for maximum engagement. The progressive lines of magnetic flux which flow through the clutch members do not go through the axially disposed teeth so that they are not subject to a reluctance effect and are easily interlocked.

BRIEF DESCRIPTION OF THE DRAWINGS

FIG. 1 is a perspective view of the electromagnetic clutch of the present invention;

FIG. 2 is an enlarged sectional view, taken along the line 2—2 of FIG. 1;

FIGS. 3 and 4 are partial sectional views, taken along the lines 3—3 and 4—4 of Figure 2; respectively; and FIG. 5 is an enlarged partial sectional view, taken along the line of 5—5 of FIG. 2.

DESCRIPTION OF THE PREFERRED EMBODIMENT

Referring specifically to FIGS. 1 and 2 of the drawings, the reference numeral 10 refers in general to the clutch of the present invention which comprises a generally cylindrical housing 12 having an open end 13 and an end plate 14 found at the other end. A counterbore 15, is found in the end plate 14, for receiving a bearing (not shown) to support an output shaft (not shown). A plurality of tappped holes 16 extend through the plate for receiving mounting bolts or the like for securing the device to an external support.

A shaft or driven member 18 is rotatably mounted within the housing and has a plurality of internal splines 19 formed at one end portion thereof which are adapted to drivingly engage the output shaft which normally extends through the bearing and into the interior of the housing 12. A circular flange member 20 is formed on the other end portion of the shaft 18 and receives non-magnetic ring 22 which is secured thereto in any conventional manner. A plurality of axially extending teeth 24 are formed on the outer face portion of the ring 22 and are also shown in FIG. 3.

An outer ring 26 is secured to the periphery of the non-magnetic ring 22 and has a portion 26a projecting from the latter ring. A plurality of radially extending teeth 28 are formed on the inner surface of the projecting portion 26a of the ring 26 and, as shown in FIG. 4, are of a generally square shape.

An electrical coil 30 is disposed in a suitable mounting assembly in the housing 12 with leads 32 extending through a grommet 34 provided in a hole formed through the wall of the housing 12 for connection to external circuitry.

A generally tubular jaw member or cylindrical member 36 has a portion extending within the open end 14 of the housing 12 adjacent the non-magnetic ring 22 and within the projecting portion 26a of the outer ring 26. The remaining portion of the jaw 36 projects outwardly from the end 14 of the housing 12, and a plurality of splines 38 are formed on the internal surface of end portion thereof. The outer periphery of the end portion of the jaw number 36 that extends within the housing 12 has a plurality of teeth 40 of a square shape which are disposed in a closely spaced relationship to the teeth 28, as better shown in FIG. 4, and cooperate with same for reasons that will be explained in detail later.

A plurality of axially extending teeth 42 are formed on the face portion of the jaw member 36 which extends within the housing 12 and are adapted to mesh with the teeth 24 of the non-magnetic ring 22 as shown in FIG. 3.

An annular core member or driving member 44 extends within the open end of the jaw 36 and has a plurality of external splines 46 formed thereon as shown in FIG. 5, which are adapted to engage with the splines 38 of the jaw member 36 as best shown in FIG. 5. The core member 44 is adapted to be secured to an input driving member (not shown) in any standard manner, such as by the use of bolts or the like, and therefore rotates relatively to the housing 12 in response to a toque input from the driving member. Driving member or core member 44 is connected to the first cylindrical member 36, and driven member or shaft 18 is connected to the second cylindrical member 20.

The jaw member 50 from right to left as viewed in FIG. 2 by means of a plurality or springs 50 which extend between an inner flange 52 formed on the jaw member 36 and the heads of a plurality of stop pins 54 which threadably engage in corresponding tapped holes symetrically formed around the axis of core member 44. The above action of the springs urges the jaw member 36 into an abutting relationship with the core member 44 and disengages the teeth 42 from the teeth 24.

A support bushing 56 is provided in engagement with the core member 44 near the central opening thereof and acts as a bearing for the output shaft and as a thrust bearing for the shaft 18 as will be described in detail later.

The housing 12, outer ring 26, jaw member 36 and the shaft 18 are all formed of magnetic materials while the ring 22 is of non-magnetic material, for reasons that will be apparent from the following. The clutch is depicted in a deactivated state in FIG. 2 with the teeth 42 out of a meshing engagement with the teeth 24 as discussed above. Also, in the deactivated state, the teeth 28 of the ring 26 are not necessarily aligned with the teeth 40 of the jaw member 36 but can vary between the aligned position shown in FIG. 4, and the other extreme position whereby the center lines of the teeth 28 are spaced a half tooth width apart from the center lines of the corresponding teeth 40.

When an energizing current is applied to the coil 30, a magnetic flux, which provides an input, including an input force and an input torque, is generated in a convenient manner which flows through the magnetic housing 12 across an air gap between the inner surface of the housing 12 and the ring 26, to the teeth 28. In the event the latter teeth are not in the perfect aligned position relative to the teeth 40 as shown in FIG. 4, the teeth 28 and 40 will be urged by the input torque and will tend to move towards the aligned position of FIG. 4 to establish a condition of minimum reluctance to the flow of the magnetic flux. The design of the teeth 24 and 28 relative to the teeth 40 and 42 is such that when the teeth 28 and 40 attain the aligned position of FIG. 4 in accordance with the foregoing, the teeth 24 and 42 will attain a position shown in FIG. 3, i.e. with the center lines of the teeth 42 coinciding with the center lines of the spaces between the teeth 24.

As a result of the energizing current and the resulting alignment of the teeth 28 and 40, an increased flux density will be transmitted through the face of the jaw 36 to the shaft 18, thereby causing an increased magnetic attraction an input force in an axial direction between the shaft 18 and the jaw member 36. The shaft 18 and the jaw member 36 then move towards each other with the jaw member moving against the bias of the springs 50, resulting in a positive and exact engagement of the teeth 42 with the teeth 24. The magnetic flux does not flow through the meshing teeth 42 and 24 since teeth 24 are composed of non-magnetic materials.

The relative movement of the shaft towards the jaw member 36 is borne by and controlled by the abutment of the end of the shaft 18 against the bushing 56, and, in the energized position, a residual air gap will exist between the face portion of the jaw member and the corresponding end of the shaft.

The above slidable movement of the jaw member 36 towards the shaft 18 will not affect the engagement of the spline 38 of the jaw member 36 with the spline 46 of the annular core member 44. Therefore, the application of an input torque to the core member will result in a corresponding rotation of the jaw member 36 and, by virtue of the mating of the teeth 42 and 24, a rotation of the shaft 18 which in turn, drives the output shaft via the splines 19.

While a particular embodiment of this invention has been described, modifications thereof will occur to those skilled in the art. For example, the relationship of the number of face teeth 42, compared to the number of radial teeth 40, though normally one to one can be designed such that the number of radial teeth 40, will be 1/N of the number of face teeth 42, where N is an integer of 1, 2, 3, etc.

Also, it is to be noted that because of the geometry of the face teeth 24 and 42, that there need not be 100 percent alignment of radial teeth 28 and 40 to enable proper engagement of said face teeth.

It is to be noted that where higher passive torque resistance such as coulomb friction exists on both the input and the output devices coupled thereto, that the spline system 38 and 46 can be fitted with a compliant devices to facilitate the rotational pre-alignment.

We claim:

1. A clutch for connecting a driving member to a driven member, said clutch comprising a first member adapted for connection to said driving member, a second member adapted for connection to said driven member, means responsive to an input and to a predetermined alignment between said first and second members for providing an interlocking engagement between said first and second members, and means responsive to said input for effecting said predetermined alignment between said members, wherein said driving member and said driven member are each in the form of shafts, and wherein said first and second members are each in the form of a first and second cylindrical member respectively, the opposing faces of said cylindrical members normally being disposed in a spaced relationship and adapted to move towards each other in an axial direction in response to said input, and wherein said cylindrical members are of a magnetic material, and further comprising means for creating a magnetic flux flow through said cylindrical members to create a magnetic attraction between said members and cause said movement, said means for creating said magnetic flux flow forming said input, and wherein said means for effecting said predetermined alignment comprises respective cooperating portions being disposed on the respective cylindrical members, the cooperating portion on one of said cylindrical members extending in a closely spaced relation to the cooperating portion on the other cylindrical member and adapted to align relative thereto in response to said magnetic flux flow to create a minimum reluctance path to said magnetic flux flow.

2. A clutch for connecting a driving member to a driven member, said clutch comprising a first member adapted for connection to said driving member, a second member adapted for connection to said driven member, means responsive to an input and to a predetermined alignment between said first and second members for providing an interlocking engagement between said first and second members, and means responsive to said input for effecting said predetermined alignment between said members, wherein said driving member and said driven member are each in the form of shafts, and wherein said first and second members are each in the form of a first and second cylindrical member respectively, the opposing faces of said cylindrical members normally being disposed in a spaced relationship and adapted to move towards each other in an axial direction in response to said input, and wherein said cylindrical members are of a magnetic material, and further comprising means for creating a magnetic flux flow through said cylindrical members to create a magnetic attraction between said members and cause said movement, said means for creating said magnetic flux flow forming said input, and wherein said means for effecting said predetermined alignment comprises a plurality of radially extending teeth being disposed on the respective cylindrical members, the radially extending teeth on one of said cylindrical members extending in a closely spaced relation to the radially extending teeth on the other cylindrical member and adapted to align relative thereto in response to said magnetic flux flow to create a minimum reluctance path to said magnetic flux flow.

3. The device of claim 2 wherein the axially extending teeth on one of said cylindrical members are formed of a non-magnetic material.

* * * * *